United States Patent [19]

Second

[11] Patent Number: 4,627,697
[45] Date of Patent: Dec. 9, 1986

[54] BACKGROUND PROJECTION SYSTEM FOR PHOTOGRAPHY

[76] Inventor: Paul Second, 251 "Les Erables" La Duchere, Lyon, France

[21] Appl. No.: 819,987

[22] Filed: Jan. 15, 1986

Related U.S. Application Data

[63] Continuation of Ser. No. 654,790, Sep. 26, 1984, abandoned.

[30] Foreign Application Priority Data

Sep. 26, 1983 [FR] France ................. 83 15734

[51] Int. Cl.⁴ .......................................... G03B 15/00
[52] U.S. Cl. ................................................. 354/77
[58] Field of Search ..................... 354/77, 78, 290; 353/63, 64, 66

[56] References Cited

U.S. PATENT DOCUMENTS

| | | | |
|---|---|---|---|
| 1,224,663 | 5/1917 | Patterson | 353/64 |
| 3,039,357 | 6/1962 | Eagle | 354/77 |
| 3,227,509 | 1/1966 | Baker | 354/77 |
| 3,486,817 | 12/1969 | Hubner | 353/66 X |
| 3,920,323 | 11/1975 | Nishitani | 353/66 X |

Primary Examiner—Michael L. Gellner
Attorney, Agent, or Firm—Karl F. Ross; Herbert Dubno

[57] ABSTRACT

A Fresnel lens or mirror is disposed between a worktable upon which an object can be placed and a background-image generator for a photographic apparatus whose subject and illuminating flash lamp are synchronized with the camera together with a flash lamp forming the light which is directed by the Fresnel element through or across the object and the objective lens unit so that a mirror ahead of the latter can direct the light onto the backdrop.

9 Claims, 6 Drawing Figures

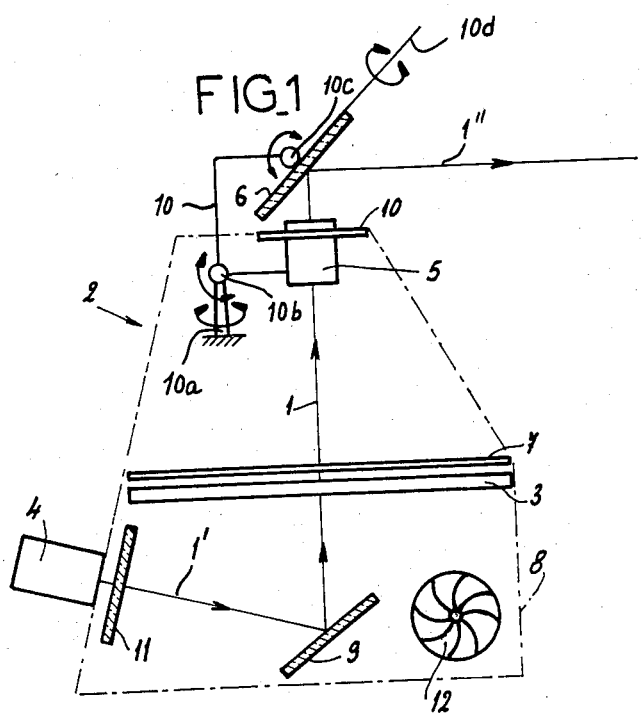
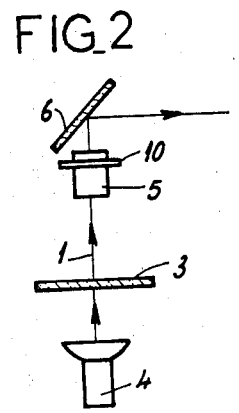
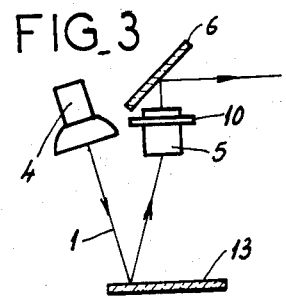
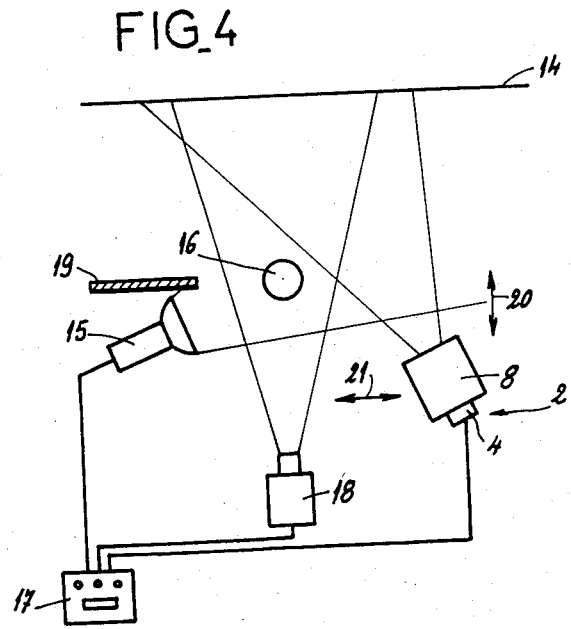

BACKGROUND PROJECTION SYSTEM FOR PHOTOGRAPHY

This is a continuation of co-pending application Ser. No. 654,790, filed on Sept. 26, 1984, now abandoned.

FIELD OF THE INVENTION

My present invention relates to a background projection system for photographic purposes and, more particularly, to a device or apparatus capable of projecting background decor in front of which a subject can be photographed.

BACKGROUND OF THE INVENTION

In photography and special studio photography and most particularly studio portrait photography, it is common practice to position the subject in front of a background or screen which has the desired background decor. It is, for example, common to provide a neutral, white, black or grey background for portrait photography in a studio but in many cases, when a more artistic effect is desired, it is necessary to create a more complicated decor as a background.

In the past, the most simple approach to providing background decor has been to use color papers or fabrics, specially painted background surfaces or replaceable backdrops preformed with the desired background decor.

Because the various colors which may be required and the various background patterns which may be desired are numerous, this has necessitated a large stock of backdrops in a studio and has resulted in considerable cost for such backdrops, for the storage space and for the handling of the backdrops, i.e. the removal of a previous backdrop and the introduction of a new backdrop. Furthermore, such handling is not always simple because the backdrops may be large and, especially when they must be self-supporting, are heavy.

Of course, it is possible to paint a backdrop in situ with the desired decor but this restricts sharply the artistic selection which may be desired and requires that changes in the desired ambiance occur over long periods of time because the high cost of repainting the background may even exceed the cost of the other systems described above.

Because of these problems it has been proposed to provide a projector which projects upon a surface located behind the subject to be photographed the desired decor. This spot projector comprises, inter alia, an iris and a mask and is disposed in front of the flash lamp illuminating the surface or the subject to be photographed and permitting, by variation of the opening of the iris or by selection of the mask, the projection of light zones of different patterns and sizes so that, for example, circles, triangles, rectangles, lines or other small shapes can be projected on the surface as a background.

This apparatus has been found to be suitable for limited uses, especially for the patterning of small surfaces but cannot be employed to obtain large projections. The heating of the projector limits the utilities still further and perhaps the greatest limitation is the fact that the iris is capable only of projecting zones of shadow and light so that the decor capabilities are minimal.

Another background projector, referred to in the trade as an "episcope" allows an image or an object to be placed on a plate illuminated by a flash and the image thereof to be focused by an objective and reflected by a semitransparent mirror on the objective lens of the photographic apparatus, namely, the portrait camera. The subject to be photographed is placed in front of a special screen and the camera takes the photograph through the semitransparent mirror, the image reflected by this mirror being juxtaposed with that of the subject by the slant of the screen.

With background projector the background does not appear in the photographic set and thus the background projected is not visible except through the viewfinder of the photographic apparatus and the illumination of the subject can present a problem with respect to the appearance of the background while the background may also prevent effective photography of the subject. In any event, without the camera viewfinder, it is impossible for the photographer to arrange the subject against the background with the best effect.

OBJECTS OF THE INVENTION

It is the principal object of the present invention to provide a background projector which is simple, easily handled, convenient to use and of low cost and which permits the projection of decor and subjects of relatively large dimensions onto a background independently of special construction of the latter and such that it does not interfere with the illumination of the subject or otherwise provide a disturbance to the photographic process.

Another object of the invention is to provide a projector for the purposes described which is more versatile than the projectors used heretofore.

SUMMARY OF THE INVENTION

These objects and others which will become apparent hereinafter are attained, in accordance with the present invention, in a system for projecting background decor which comprises a Fresnel lens adapted to receive at one of its faces an object whose image is to be projected to form the decor and whose opposite face receives a light beam from a light source whose operation is synchronized with the photographic apparatus, i.e. an electronic flash lamp triggered by the user and preferably synchronized with any flash lamps which are triggered upon the taking of the photograph.

According to the invention, moreover, an objective lens unit has its principal axis coinciding with that of the Fresnel lamp and is disposed in the path of the light beam refracted by the Fresnel lens. A mirror is disposed above this objective and hence on the opposite side of the objective from the Fresnel lens and reflects the image of the object on the Fresnel lens onto a surface advantageously located behind the subject to be photographed and thus in the field of the photographic apparatus. The image of the object generated by this system constitutes the decor and is projected on a screen or wall disposed behind the subject to be photographed or on the subject and can be photographed at the same time as the subject. The image is a real image and is visible by all, thereby facilitating appreciation of the effects obtained.

A pilot lamp is combined with a flash lamp viewing the decor projector before the flash lamp is triggered and allows the decor to be viewed during set up. The size of the image can be modified by displacing the device relative to the projection plane or by the use of a varifocal lens system as an objective.

Advantageously, the head of the device carrying the mirror and the objective lens can be pivoted about a vertical axis and about a horizontal axis and the mirror itself can be oriented with respect to two such axes so that the position of the image can be modified with respect to both the horizontal and the vertical directions.

BRIEF DESCRIPTION OF THE DRAWING

The above and other objects, features and advantages of the present invention will become more readily apparent from the following description, reference being made to the accompanying drawing in which:

FIG. 1 is a diagram of a projector which can be used in the system of the invention with parts in section and in highly schematic form;

FIGS. 2 and 3 are reduced-scale elevational views, also in highly diagrammatic form, of other embodiments of the device of FIG. 1; and FIGS. 4 through 6 are diagrams showing the use of this apparatus in various photographic systems according to the invention.

SPECIFIC DESCRIPTION

Figure 5:
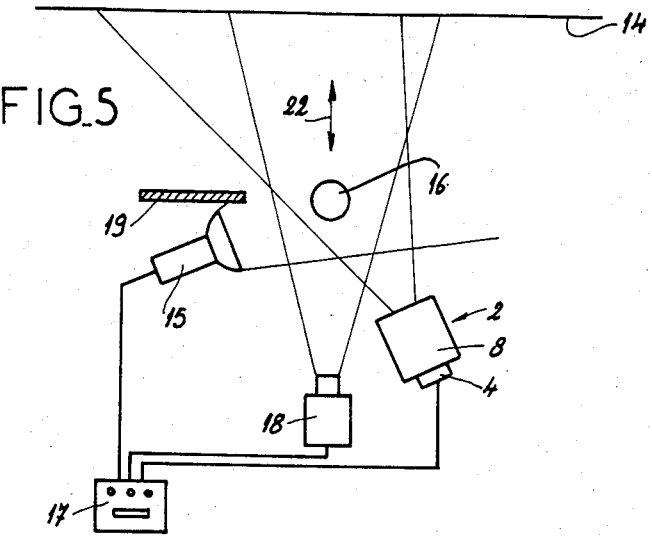

As can be seen from FIG. 1, an apparatus 2 for producing ground decor for photographic purposes can comprise a housing 8 represented in dot-dash lines in which a Fresnel lens 3 is disposed.

The housing 8 can also carry an electronic flash unit 4 which can be connected with a synchronizing circuit (represented at 17 in FIG. 4) to generate a burst of illumination represented by the ray 1' and which is directed to a mirror 9 reflecting the ray as represented at 1 through the Fresnel lens 3, an objective lens 5 disposed along the optical axis of the Fresnel lens, and onto a mirror 6 inclined to this optical axis and directing the ray 1" onto the backdrop or screen.

The Fresnel lens 3 is disposed horizontally in the housing and directly thereabove and preferably in contact therewith is a worktable 7 which is transparent and upon which is placed an object whose image is to be projected by the device 2 to constitute the projected decor.

This object can be a transparency or diapositive, colored filters or cut-outs or any patterning objects which can be flat or three-dimensional.

The illuminating source 4 can be associated with a continuous light source such as an incandescent lamp which can direct a beam of light through the system along the optical path 1', 1" to allow display of the decor for set-up prior to taking the picture. The electronic flash unit 4, as noted, is synchronized with the photographic apparatus and an insulating glass 11 can be interposed between this high-intensity flash lamp and the interior of the housing 8, to minimize the ingress of the heat.

The objective lens 5 and the mirror 6 are mounted on a head diagrammatically represented at 10 which can be pivoted about a vertical axis defined by a support 10a and about a horizontal axis as defined by the support 10b to allow tilting of the head about these axes and in two distinct planes on the head 10; the mirror 6 can in turn be mounted by a horizontal pivot 10c and a vertical pivot represented by the axis 10d to allow tilting of the mirror relative to the objective lens and thereby permit orientation of the projected image on the screen.

The screen is located, as will be discussed in connection with FIGS. 4 through 6, in the field of the photographic apparatus.

The pivoting head 10 can swing through 360° about the vertical pivotal axis and preferably should be pivotal through more than 90° about the horizontal axis. The projection can thus be oriented in both the vertical and horizontal directions to any position in the background.

The objective lens unit 5 is replaceable and can even be a variable-focus (varifocal) unit to allow the size of the projected image to be modified. The device 2 may also be mounted on rollers or placed upon a rolling table so that its displacement toward and away from the backdrop or its distance with respect to the field can be varied. This likewise will vary the dimensions of the projection.

The user can thus provide a projected image on a screen or other backdrop of various shapes and color depending upon the object or objects placed upon the table 7 so as to create zones of light of different colors at different locations and in different patterns. The pilot lamp or continuous filament lamp incorporated in the unit 4 permits viewing the patterns or backgrounds obtained.

The housing 8 also includes a blower 12 to cool the interior thereof.

FIGS. 2 and 3 show other embodiments of the invention in which the same reference numerals have been used to designate similar elements.

In FIG. 2, for example, the electronic flash unit 4 is disposed directly below the Fresnel lens 3 along the optical axis thereof and the light from this lamp passes directly through the lens and does not require reflection by a mirror 9.

In the embodiment of FIG. 3, the Fresnel lens is formed by a Fresnel mirror 13 disposed horizontally and the light source 4 is disposed above the Fresnel mirror and the beam is reflected and refracted as it passes onto and from this mirror to the objective 5. This arrangement is far more compact than the embodiments previously described.

FIG. 4 shows a photographic set-up in which the unit 2 has its flash lamp 4 connected to the synchronizing circuit or power pack 17 to which the camera 18 is likewise connected to trigger the taking of the photograph. Reference numeral 16 indicates the subject of the photograph and the backdrop is formed by a screen 14 onto which the image from the projector 2 is cast. A flash lamp 15 is provided to illuminate the subject 16 and a panel 19 is provided to mask the light from the latter lamp and prevent it from interfering with the display decor by impinging upon the screen 14. To change the size or orient the decor, the projector can be moved with respect to the surface 14 and the subject 16 as illustrated by the double-head arrows 20 and 21.

More varied effects can be obtained utilizing the embodiment of FIG. 5 where the decor is projected not only on the screen 14 but also in the subject 16 to be photographed. Here it is possible, for example, to display on the screen an image of a bottle or other semitransparent object placed on the table 7 so that the photograph will show the subject incorporated within the bottle or like object. In this case, the subject can be located further or closer to the screen as represented by the double-head arrow 22. Here the panel 19 may or may not be used.

In a modification of this embodiment, a cardboard mask can be placed upon the worktable 7 of the projector such that light from the projector is blocked in the region of the subject but the decor is formed around the subject. Conversely, the projection may be masked to any desired degree around the subject.

Figure 6:
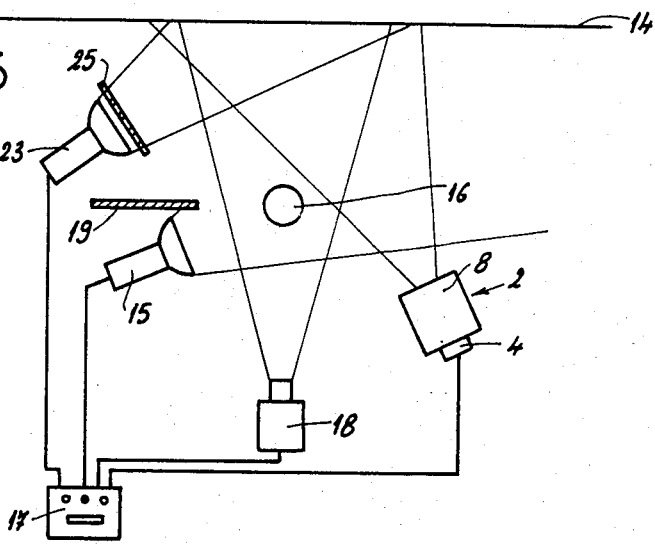

In FIG. 6 the arrangement is similar to that shown in FIG. 5 and an additional flash lamp 23 is provided and is triggered by the same generator 17 as the other two flash lamps 4 and 15 synchronized with the camera.

The additional lamp 23 can be provided with replaceable color filters 25 so that a hue depending upon the selected filter can be applied to the background and enhance the decorative effects.

Here too, the masking panel 19 can be used or can be removed.

The invention also contemplates providing the flash lamp 4 with its own high-voltage generator 17 which can be synchronized with the generator shown and which can deliver a longer and significantly more powerful pulse to the lamp generating the background decor. This has been found to be advantageous when larger surfaces are to be illuminated.

This and other modifications are considered to be within the spirit and scope of the appended claims. The projection results can be modulated as required to provide greater or lesser contrast with the subject, complete or partial coloration and with respect to dimensional changes. The system of the invention can be used for portrait, fashion, or industrial photography, etc. with considerable ease since the worktable 8 is readily accessible.

I claim:

1. A photographic apparatus comprising:
   a backdrop;
   a subject station located in front of said backdrop;
   a camera trained on said subject station having an optical axis and a photographic field encompassing said station and at least a portion of said backdrop directly behind said station along said optical axis;
   a background decor projector training a light beam upon said backdrop and at least upon said portion thereof without interception by said subject and from a location offset from said optical axis, said background decor projector comprising:
     a flat Fresnel element having a working surface along which an object can be deposed to produce an image adapted to be projected on said backdrop,
     a backdrop decor flash lamp for generating said light beam and positioned so that said light beam traverses said Fresnel element,
     an objective lens unit disposed along an optical axis of said Fresnel element and receiving the light beam after it has passed said object, and
     a mirror between said objective lens unit and said backdrop and out of the optical axis of said camera for reflecting an image of said object onto said backdrop so that the image on said backdrop is fully visible independently of a view finder of said camera; and
   means for synchronously triggering said flash lamps and said camera to photograph said subject on a background formed by said image.

2. A photographic apparatus comprising:
   a backdrop;
   a subject station located in front of said backdrop;
   a camera trained on said subject station having an optical axis and a photographic field encompassing said station and at least a portion of said backdrop directly behind said station along said optical axis;
   a background decor projector training a light beam upon said backdrop and at least upon said portion thereof without interception by said subject and from a location offset from said optical axis, said background decor projector comprising:
     a flat Fresnel element having a working surface along which an object can be deposed to produce an image adapted to be projected on said backdrop,
     a backdrop decor flash lamp for generating said light beam and positioned so that said light beam traverses said Fresnel element,
     an objective lens unit disposed along an optical axis of said Fresnel element and receiving the light beam after it has passed said object, and
     a mirror between said objective lens unit and said backdrop and out of the optical axis of said camera for reflecting an image of said object onto said backdrop so that the image on said backdrop is fully visible independently of a view finder of said camera;
   a subject-lighting flash lamp positioned to illuminate said subject station and a subject at said station;
   a screen interposed between said subject-lighting flash lamp and said backdrop for preventing direct illumination of said backdrop by said subject-lighting flash lamp; and
   means for synchronously triggering said flash lamps and said camera to photograph said subject on a background formed by said image.

3. The photographic apparatus defined in claim 2 wherein said projector comprises a housing, said background decor flash lamp being an electronic flash mounted on said housing.

4. The photographic apparatus defined in claim 3 wherein said housing is provided with a head pivotable about a vertical axis and a horizontal axis, said mirror being mounted on said head.

5. The photographic apparatus defined in claim 4 wherein said objective lens unit is also mounted on said head.

6. The photographic apparatus defined in claim 3, further comprising a blower mounted on said housing.

7. The photographic apparatus defined in claim 3 wherein said Fresnel element is a Fresnel lens transluminated by light from said background decor lamp.

8. The photographic apparatus defined in claim 3 wherein said Fresnel element is a mirror.

9. The photographic apparatus defined in claim 2, further comprising a background color flash lamp trained on said backdrop for casting a color thereon behind said station and triggered in synchrony with said background decor flash lamp and subject-lighting flash lamp and said camera by said synchronizing means.

* * * * *